United States Patent [19]

Kaneko et al.

[11] Patent Number: 5,352,859
[45] Date of Patent: Oct. 4, 1994

[54] ADAPTIVE METHOD AND APPARATUS FOR CONTROLLING MACHINING CURRENT IN ELECTRIC DISCHARGE MACHINES

[75] Inventors: Yuji Kaneko, Yokohama; Nobuyoshi Nabekura, Sakai, both of Japan

[73] Assignee: Sodick Co., Ltd., Yokohama, Japan

[21] Appl. No.: 53,806

[22] Filed: Apr. 29, 1993

Related U.S. Application Data

[63] Continuation of Ser. No. 861,037, Mar. 31, 1992, abandoned.

[30] Foreign Application Priority Data

Apr. 1, 1991 [JP] Japan .................................. 3-094715

[51] Int. Cl.⁵ .......................... B23H 1/02; B23H 7/20
[52] U.S. Cl. .................... 219/69.13; 219/69.18
[58] Field of Search ............... 219/69.13, 69.18, 69.17

[56] References Cited

U.S. PATENT DOCUMENTS

| | | | |
|---|---|---|---|
| 3,705,286 | 12/1972 | Kondo et al. | 219/69.13 |
| 3,729,610 | 4/1973 | Kondo | 219/69.13 |
| 3,997,753 | 12/1976 | Inoue | 219/69.13 |
| 4,504,722 | 3/1985 | Kishi et al. | 219/69.18 |
| 4,800,248 | 1/1989 | Futamura et al. | 219/69.18 |
| 4,806,719 | 2/1989 | Seerieder et al. | 219/69.13 |
| 4,892,989 | 1/1990 | Itoh | 219/69.13 |
| 5,064,984 | 11/1991 | Yamamoto et al. | 219/69.18 |

FOREIGN PATENT DOCUMENTS

| | | | |
|---|---|---|---|
| 47-13795 | 7/1972 | Japan . | |
| 47-50276 | 12/1972 | Japan . | |
| 51-119597 | 10/1976 | Japan . | |
| 56-163835 | 12/1981 | Japan | 219/69.13 |
| 57-89523 | 6/1982 | Japan | 219/69.13 |
| 61-125729 | 6/1986 | Japan | 219/69.18 |
| 61-197123 | 9/1986 | Japan . | |
| 62-193728 | 8/1987 | Japan . | |

Primary Examiner—Geoffrey S. Evans
Attorney, Agent, or Firm—Marks & Murase

[57] ABSTRACT

An adaptive apparatus for controlling the discharge current comprises a circuit for sensing the gap voltage and a circuit for sensing the gap current. Based upon these sensed conditions at the gap, the waveform of the discharge current is detected. The waveform of the current is compared to several reference levels at certain times during the waveform in order to determine the condition at the gap. The reference levels may be varied in accordance with the machining method, such as in accordance with the peak value of current. The off times for the pulses are then varied according to the conditions at the gap. The pulses of discharge current are therefore controlled in order to provide the optimal machining rate and an improved workpiece surface finish while reducing arc discharges.

12 Claims, 12 Drawing Sheets

FIG. 11

| PEAK CURRENT (A) | LZ LEVEL | HZ LEVEL | ARC LEVEL |
|---|---|---|---|
| 2 | 2.5 V | 2.0 V | 3.0 V |
| 4 | 2.3 | 1.5 | 2.8 |
| 6 | 2.0 | 1.3 | 2.5 |
| 8 | 1.4 | 0.5 | 2.0 |
| 10 | 1.2 | 0.3 | 2.0 |
| 12 | 1.1 | 0.2 | 2.0 |
| 14 | 0.9 | 0.1 | 1.8 |

ADAPTIVE METHOD AND APPARATUS FOR CONTROLLING MACHINING CURRENT IN ELECTRIC DISCHARGE MACHINES

This application is a continuation of application Ser. No. 07/861,037 filed Mar. 31, 1992, now abandoned.

FIELD OF THE INVENTION

This invention generally relates to an adaptive method and apparatus for controlling the machining current in electric discharge machines and, more particularly, for controlling the waveform of the discharge current with varying peak currents.

BACKGROUND OF THE INVENTION

In general, an electrical discharge, induced by a pulse of current between a workpiece and an electrode, results in the removal of a small crater of material from the workpiece. Electric discharge machining may be performed by the application of a plurality of electrical discharges in a highly repetitive manner. The spacing between the electrode and the workpiece, called the gap, is typically on the order of a few microns, or tens of microns, and is typically filled with a dielectric machining liquid, such as water or kerosene. The pulses of current have a nearly constant peak current value and constant pulse width having an ON state and OFF state for the predetermined machining condition. In order to induce optimal electric discharge machining, the pulse-like discharges of current must be optimally controlled in accordance with the material and hardness of the workpiece and the discharging condition at the gap.

The current waveforms for the discharges across the gap vary according to the conditions at the gap, as illustrated by graphs A to E of FIG. 2. Although the ordinate is labeled in volts, the waveforms represent the current discharged across the gap. For example, when the machining liquid decomposes into gas, tar, and carbon, and products of the discharge, or metal sludge are present in the gap, the impedance across the gap is reduced thereby resulting in a concentrated discharge as shown by graph A. This type of discharge is characterized by a fairly sharp rising edge at the beginning of the spark followed by a leveling off of the voltage. The type A discharge may be produced by an insufficient return to a dielectric state in the gap after a discharge current pulse. This may also produce a constant arcing between the electrode and the workpiece which is undesirable since it damages the electrode without contributing to the machining of the workpiece. Although the current would increase in response to a shortening in the OFF time of the pulses, contrary to the expectation that the machining rate would also be increased, the machining rate would actually be decreased due to the constant arcing.

A second type of discharge, shown by the graph B, may be created when fewer products are present across the gap. The type B discharge has a relatively favorable rising edge since it does not encounter the undesirable shaded area characterized by the arcing. The stable discharges, and hence more desirable discharges, are denoted by graphs C and D. These discharges are produced when the gap conditions are between a low level of impedance LZ and a high level of impedance HZ. The fifth type of discharge symbolized by the graph E occurs when an impurity in the gap exists resulting in a high impedance. The type E discharge does not even reach the HZ level.

When the first or the fifth types of discharges are produced, in other words those that intersect the undesirable shaded areas in FIG. 2, the OFF time of the pulses must be significantly extended or the electric machining of the workpiece will stop. Also, when a type B discharge comes close to reaching the ARC level, the OFF time must be extended in order to prevent an unstable discharge. Conversely, when type C or D discharges are produced, it is desirable to decrease the OFF time in order to increase the machining rate.

Japanese patent publication JP-B 47-50276 discloses an electric discharge machining apparatus which detects a change in the gap voltage only during the discharging time in order to control the discharge current. A first resistor is placed in series with an electrode and a workpiece for detecting the start of spark discharging. In one embodiment, a transistor responded to the start of spark discharge and to the voltage across a second resistor connected in parallel with the gap to detect gap voltage at a certain time during each pulse. In another embodiment, two transistors respond to the start of spark discharge and to the voltage across two resistors connected in parallel with the gap to detect two gap voltages at two different times during each pulse.

Japanese patent publication JP-A 47-13795 discloses another example of a conventional controller which detects a voltage variation slope, a mean voltage level, and a high frequency component. Two out of the three signals detected are then extracted to display the machining state, to control a pulse generator, or to control a servo device.

Japanese patent publication JP-A 51-119597 discloses a method of controlling pulse discharge comprised of detecting the plurality of pulses discharged across the gap; determining the machining state from the detected pulses and then producing a digital control signal. The apparatus is comprised of a discriminator for discriminating the detected pulses, a counter for counting the discriminated results, and a control signal generator for increasing or decreasing the gap distance by comparing the count to a reference level.

In order to control the machining current more accurately, it would be more preferable to detect the waveform of the discharge current. This, however, is difficult because the detecting levels, especially the level for peak current, vary significantly when the settings of the machining condition are changed to meet the machining needs.

SUMMARY OF THE INVENTION

It is an object of the present invention to provide a method and apparatus for controlling the discharge current in which the waveform for the discharge current is controlled optimally.

It is another object of the present invention to provide a method and apparatus for controlling the discharge current in which the waveform of the discharge current is detected accurately.

It is a further object of the present invention to provide a method and apparatus for optimally controlling the discharge current even with varying values of peak current.

It is yet a further object of the present invention to provide a method and apparatus for controlling the discharge current in which the off times for the pulses of current are optimally set.

It is yet another object of the present invention to provide a method and apparatus for controlling the discharge current which has an improved machining rate.

It is still a further object of the present invention to provide a method and apparatus for controlling the discharge current which minimizes the amount of arcing across the gap.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the adaptive apparatus comprises a first circuit which is connected in parallel with a gap formed between an electrode and a workpiece for supplying pulses of machining current across the gap. A second circuit is used for detecting the discharges across the gap and a discriminating circuit compares the detected discharges to references levels, which may vary according to the machining method being used. The off time of the current pulse is then controlled based upon the results of the discriminating circuit.

Preferably, for example, the discriminating circuit decides whether a high impedance condition exists at the gap 5 $\mu$s after the onset of the discharge, whether a low impedance condition exists at the gap 15 $\mu$s after the onset of the discharge, and whether arcing is occurring halfway through the on time of the pulse.

The adaptive method comprises the steps of entering the machining condition and then setting the bases by which subsequent discriminations are to be made. Next, the discriminations are performed and then the off time for the pulse is set in accordance with the results of the discriminations.

BRIEF DESCRIPTION OF THE DRAWINGS

The accompanying drawings, which are incorporated in, and form a part of the specification, illustrate an embodiment of the present invention and, together with the description, serve to explain the principles of the invention. In the drawings:

FIG. 11 is an exemplary data chart for the settings of FIG. 1;

DETAILED DESCRIPTION OF THE PREFERRED EMBODIMENT

Reference will now be made in detail to the preferred embodiment of the invention, an example of which is illustrated in the accompanying drawings.

Figure 1:
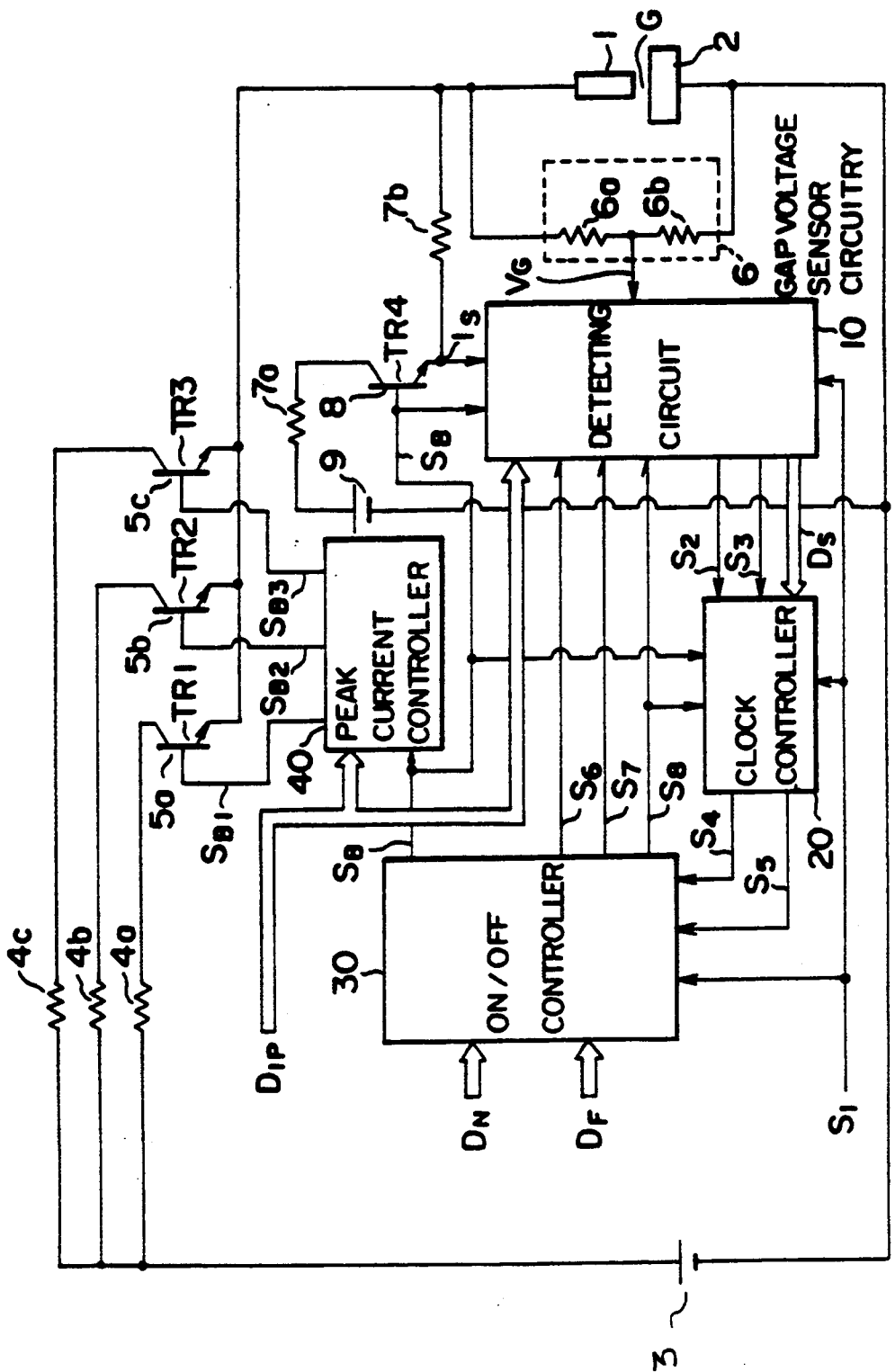
FIG. 1 illustrates a block diagram of an embodiment of the invention.

In FIG. 1, an electrode 1 of an electric discharge machine and a workpiece 2 with a gap G therebetween are depicted symbolically. A first circuit, for supplying machining current to the gap G, and comprises a DC power source 3, current limiting resistors 4a, 4b, and 4c and switching transistors 5a, 5b, and 5c connected in series with the electrode 1, gap G, and the workpiece 2 is also shown. Each one of the current limiting resistors 4a, 4b, and 4c, have different magnitudes of resistance, and each is connected in series with a respective one of the switching transistor 5a, 5b, and 5c. The series combinations of the current limiting resistors 4a, 4b, and 4c with the respective switching transistors 5a, 5b, and 5c are connected in parallel to each other between the electrode 1 and the power source 3.

A gap voltage detecting circuit 6 is connected in parallel with the gap. The gap voltage detecting circuit 6 produces a gap voltage $V_G$ and may be comprised, for example, of two resistors 6a and 6b that form a voltage divider.

A circuit for monitoring the waveform of the discharge current is connected in parallel with the gap voltage detecting circuit 6. The monitoring circuit comprises a DC power source 9, current limiting resistor 7a, a switching transistor 8, a detecting resistor 7b, and a detecting circuit 10. The voltages at the base and the emitter of the switching transistor 8 are supplied to the detecting circuit 10, which also receives peak current data $D_{IP}$, the gap voltage $V_G$, a current signal $I_S$, a base signal $S_B$, an ON half signal $S_6$, an OFF end signal $S_7$, an ON end signal $S_8$, and a clock signal $S_1$. Based upon the received signals, the detecting circuit 10 generates a signal $S_2$, a spark signal $S_3$, and select data $D_S$ which are then supplied to a clock controller 20.

Based upon the signals received from the detecting circuit 10 as well as the base signal $S_B$, the clock signal $S_1$, and the ON end signal $S_8$, the clock controller 20 generates an ON clock signal $S_4$ and an OFF clock signal $S_5$ and transmits these signals to an ON/OFF controller 30. The ON/OFF controller 30 receives ON command data $D_N$, OFF command data $D_F$, the clock signal $S_1$, the ON clock signal $S_4$, and the OFF clock signal $S_5$. Based upon these signals, the ON/OFF controller 30 then generates the base signal $S_B$, the ON half signal $S_6$, the OFF end signal $S_7$, and the ON end signal $S_8$.

The base signal $S_B$ is also sent to a peak controller 40 and to the switching transistor 8. At the peak controller 40, the base signal $S_B$ and the peak current data $D_{IP}$ are used to selectively generate base signals $S_{B1}$, $S_{B2}$, and $S_{B3}$. The base signals $S_{B1}$, $S_{B2}$, and $S_{B3}$ are supplied to the bases of the switching transistors 5a, 5b, and 5c, respectively, for selectively turning on and off the transistors in order to selectively control the peak current passing through the gap G. The base signal $S_B$ is also used to turn on the switching transistor 8, which produces a current through resistor 7b resulting in the current signal $I_S$. The current signal $I_S$ is used for detecting the waveform of the discharge current. Thus, the current signal $I_S$ will generally correspond to one of the waveforms of discharge current illustrated in FIG. 2.

Figure 3:
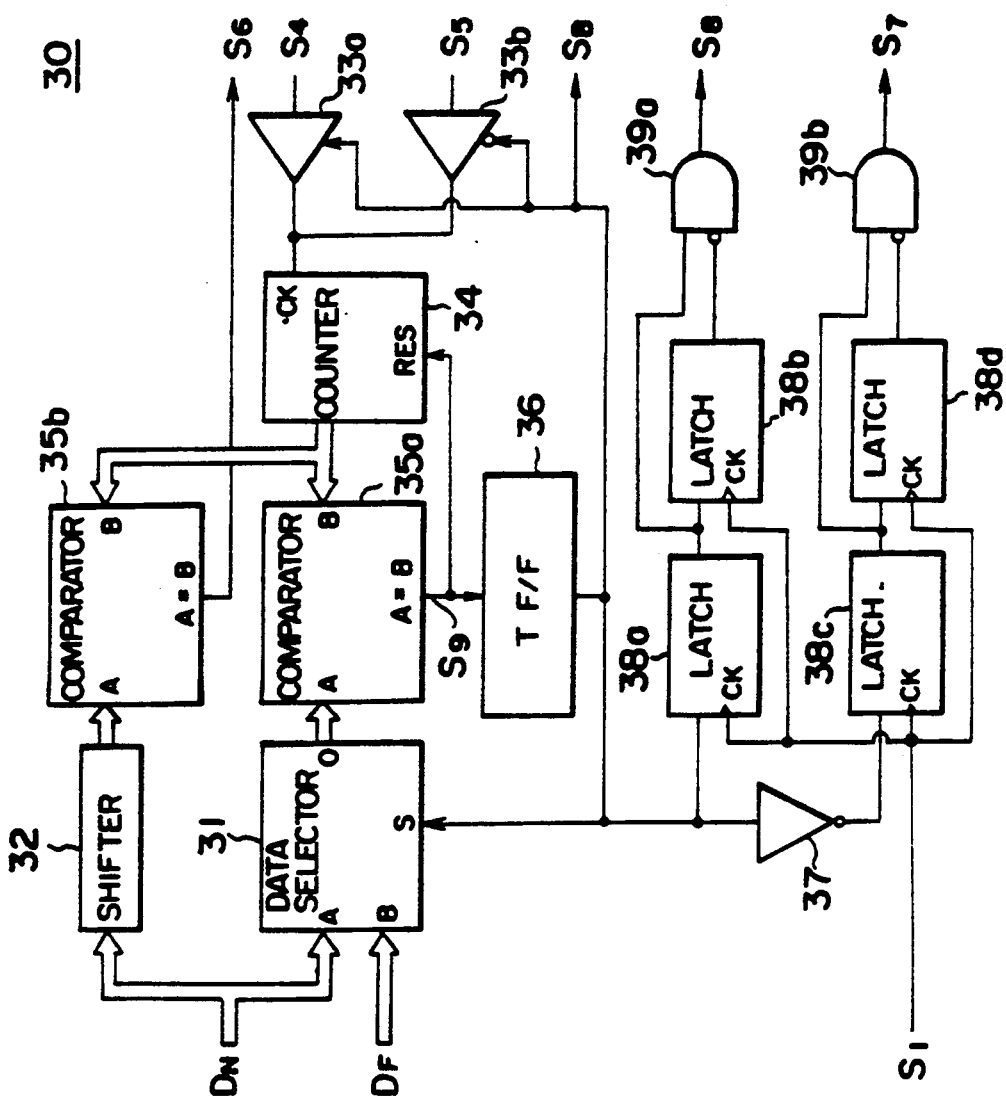
FIG. 3 illustrates an embodiment of the ON/OFF controller of FIG. 1.

An embodiment of the ON/OFF controller 30 is illustrated in FIG. 3. The ON/OFF controller 30 may comprise a data selector 31 which outputs either the ON command data $D_N$ from its A input or the OFF command data $D_F$ from its B input according to a signal at its select input S. The output of the data selector 31 is received at a comparator 35a. The comparator 35a receives a count from a counter 34 and generates a signal $S_9$ when the count equals the value supplied by the data selector 31. The signal $S_9$ also resets the counter 34.

The ON command data $D_N$ is also received at a shifter 32, which reduces the data $D_N$ in half and supplies the halved data to a comparator 35b. The comparator 35b also receives the count from the counter 34 and generates the ON half signal $S_6$ when the count equals half of the ON command data $D_N$.

The signal $S_9$ toggles an output of a toggle flip-flop 36, which results in the generation of the base signal $S_B$. The base signal $S_B$ is sent to a pair of three state buffers 33a and 33b for determining whether the counter will receive the ON clock signal $S_4$ or the OFF clock signal $S_5$. The base signal $S_B$ is also sent to a latch circuit 38a and through an inverter 37 to a latch circuit 38c. Latch circuits 38a, 38b, 38c, and 38d all receive the clock signal $S_1$ at their clock input CK. Further, latch circuit 38b is latched by the output of latch circuit 38a and latch circuit 38d is latched by the output of latch circuit 38c. An AND gate 39a receives an inverted output of latch circuit 38b and the output of latch circuit 38a as inputs and, as an output, generates the ON end signal $S_8$. An AND gate 39b receives an inverted output of latch circuit 38d and the output of latch circuit 38c as inputs and, as an output, generates the OFF end signal $S_7$.

Figure 4:
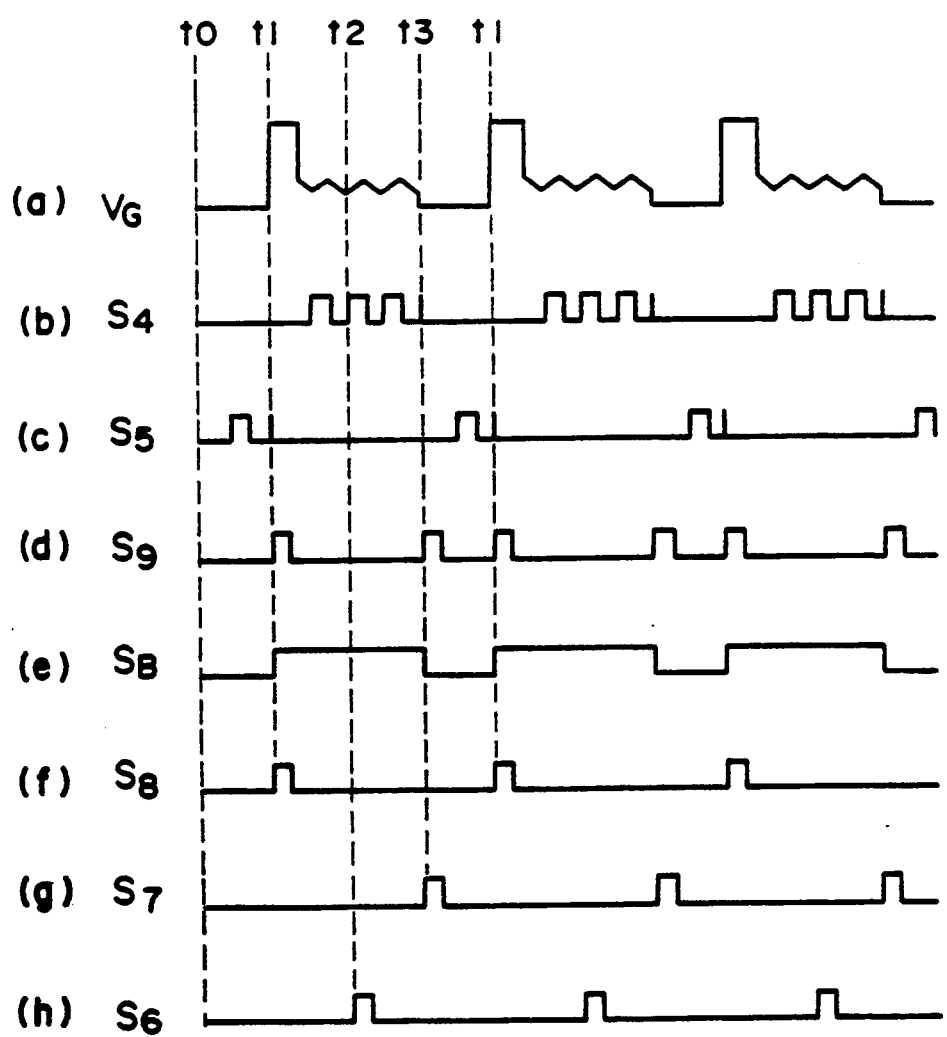
FIG. 4 is a timing chart for signals associated with the ON/OFF controller of FIG. 3.

An operation of the ON/OFF controller 30 will be described with reference to the exemplary timing chart of FIG. 4. As an example, the ON command data has a value of 4 and the OFF command data has a value of 2.

At a time $t_0$, the data selector 31 selects the OFF time data of 2. Since the base signal $S_B$ has a logical value of "0," the three state buffer 33b is enabled resulting in the application of the OFF clock $S_5$ to the counter 34. At time $t_1$, at the onset of the second OFF clock pulse $S_5$, the count from counter 34 equals the OFF command data $D_F$, which causes the comparator 35a to generate a pulse $S_9$ thereby resetting the counter 34. The toggle flip-flop 36 receives the pulse $S_9$ and generates a base signal $S_B$ with a logical value of "1", thereby enabling the three state buffer 33a to pass the ON clock $S_4$ to the counter 34, causing the selection of the ON command data $D_N$, and the generating of the ON end signal $S_8$.

Thus at the time $t_1$, the base signal $S_B$ causes power to be applied across the gap G and the ON/OFF controller is set to count the ON time of the base signal $S_B$. At a time $t_2$, when two out of the four pulses of the ON clock $S_4$ have been received, the comparator 35b generates the ON half signal $S_6$. When all four of the ON clock pulses have been received at the counter 34 at a time $t_3$, the comparator 35a generates a pulse $S_9$, which toggles the toggle flip-flop 36 to generate a base signal $S_B$ with a logical value of "0." A base signal with a logical value of "0" resets the counter 34 to count the OFF time and removes the power from across the gap G. Also at the time $t_3$, the ON/OFF controller is reset to the conditions at the time $t_0$ and the process repeats itself.

Figure 5:
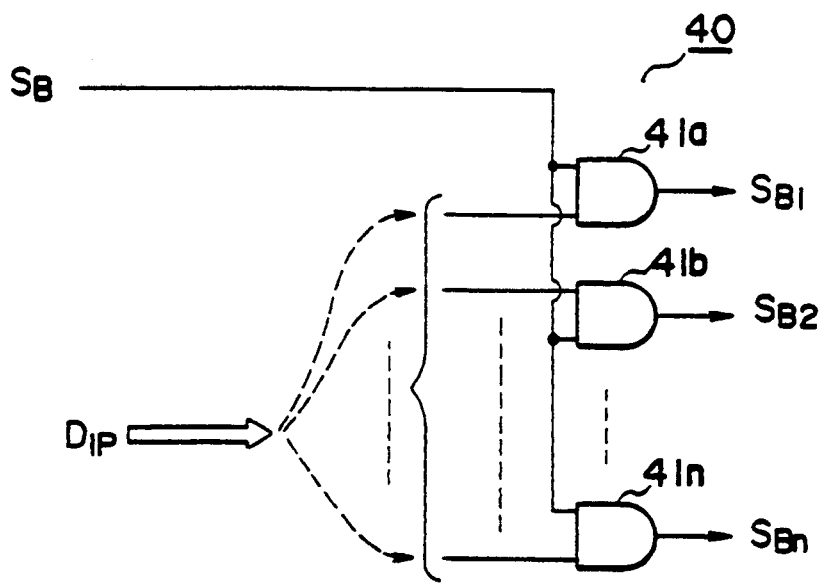
FIG. 5 illustrates an embodiment of the peak current controller of FIG. 1.

An embodiment of the peak current controller 40 is illustrated in FIG. 5. The peak current controller 40 may comprise a plurality of AND gates 41a, 41b, . . . 41n. Each of the AND gates has the base signal $S_B$ as one of its two inputs and a respective data line from the peak current data $D_{IP}$ at its other input. Based upon these two inputs, the AND gates 41 generate output signals $S_{B1}$, $S_{B2}$, . . . $S_{Bn}$ which are supplied to the bases of the switching transistors 5. Thus, for example, only when both the base signal $S_B$ and the respective data line received from the peak current data $D_{IP}$ have a logical value of "1" will the AND gate 41a generate an output signal $S_{B1}$. Since only three switching transistors 5a, 5b, and 5c have been illustrated in FIG. 1, the number n is equal to 3, although a greater number may be used.

Figure 6:
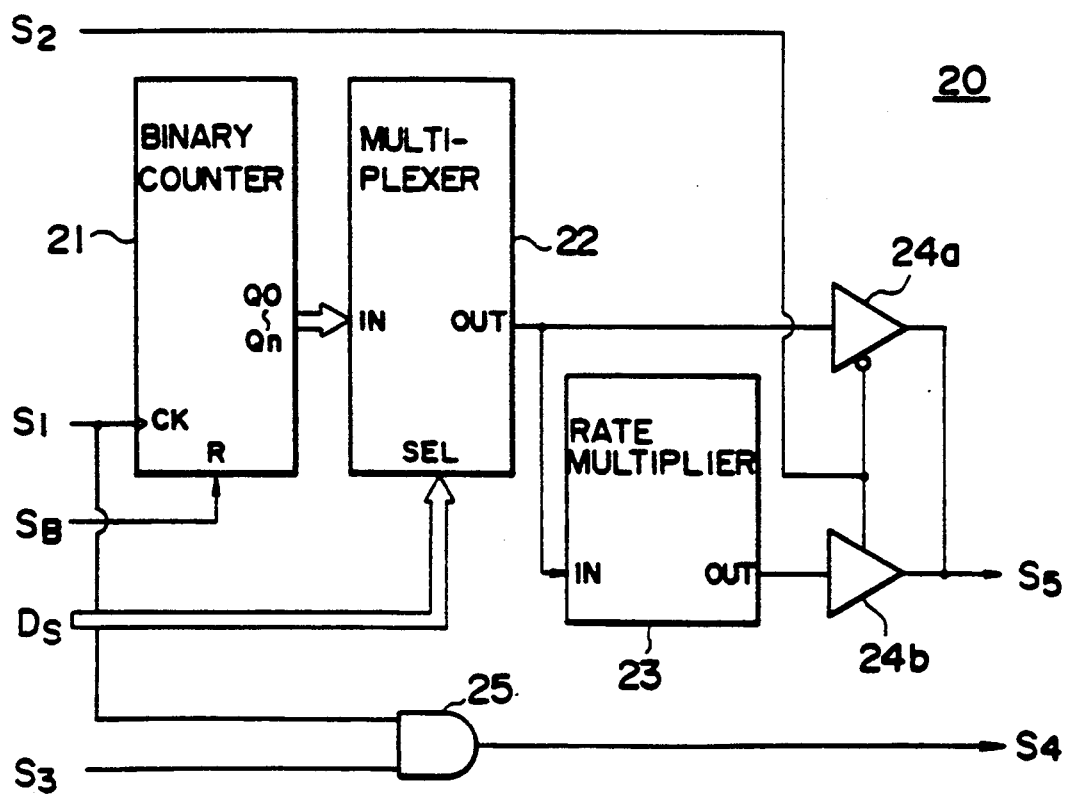
FIG. 6 illustrates an embodiment of the clock controller of FIG. 1.
Figure 7:
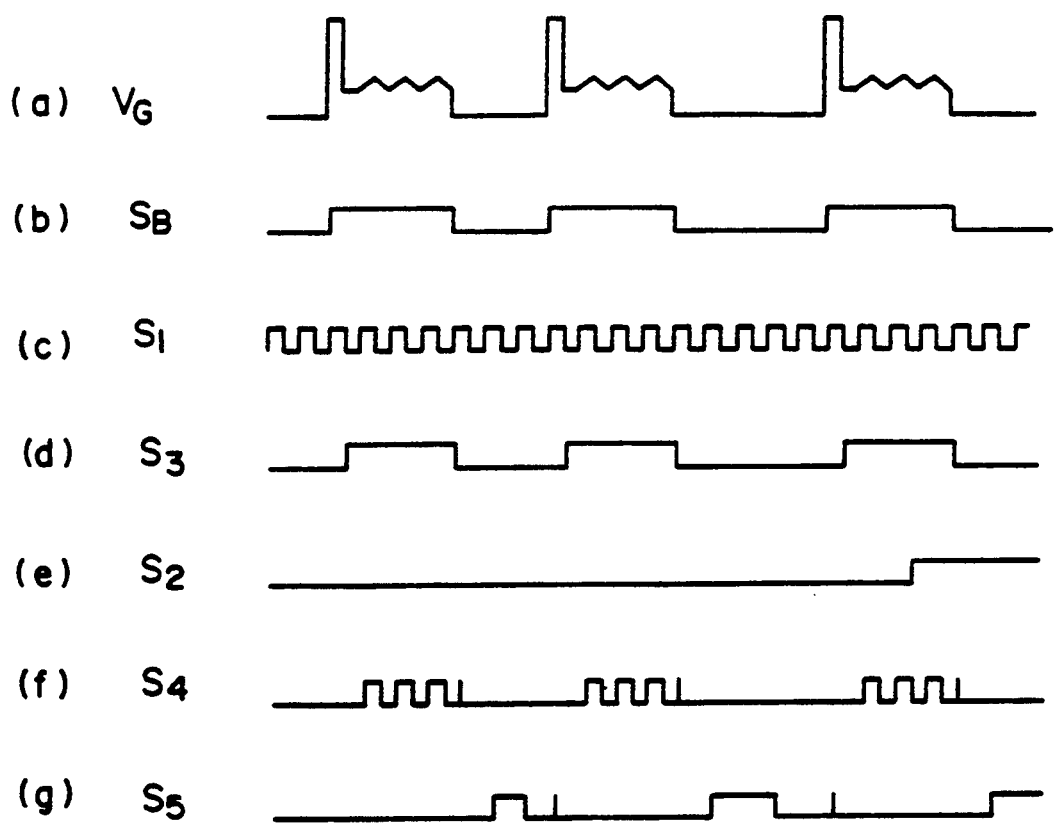
FIG. 7 is a timing chart for signals associated with the clock controller of FIG. 6.

An embodiment of the clock controller 20 is illustrated in FIG. 6, with an exemplary timing chart being shown in FIG. 7. The clock controller 20 may comprise a binary counter 21 which receives the clock signal $S_1$ at its clock input CK and the base signal $S_B$ at its reset input R. A multiplexer 22 selects the output data from the binary counter 21 according to the data signal $D_S$ received at its select input SEL. A rate multiplier 23 divides the output signal from the multiplexer 22 by ten and supplies the divided output to a three state buffer 24b. The three state buffer 24b produces the OFF clock $S_5$ when the signal $S_2$ is received and a three state buffer 24a, which receives the output from the multiplexer 22, produces the OFF clock $S_5$ when an inverted signal $S_2$ is received. An AND gate 25 produces the ON clock $S_4$ only when both the spark signal $S_3$ and the clock signal $S_1$ are received.

Figure 8:
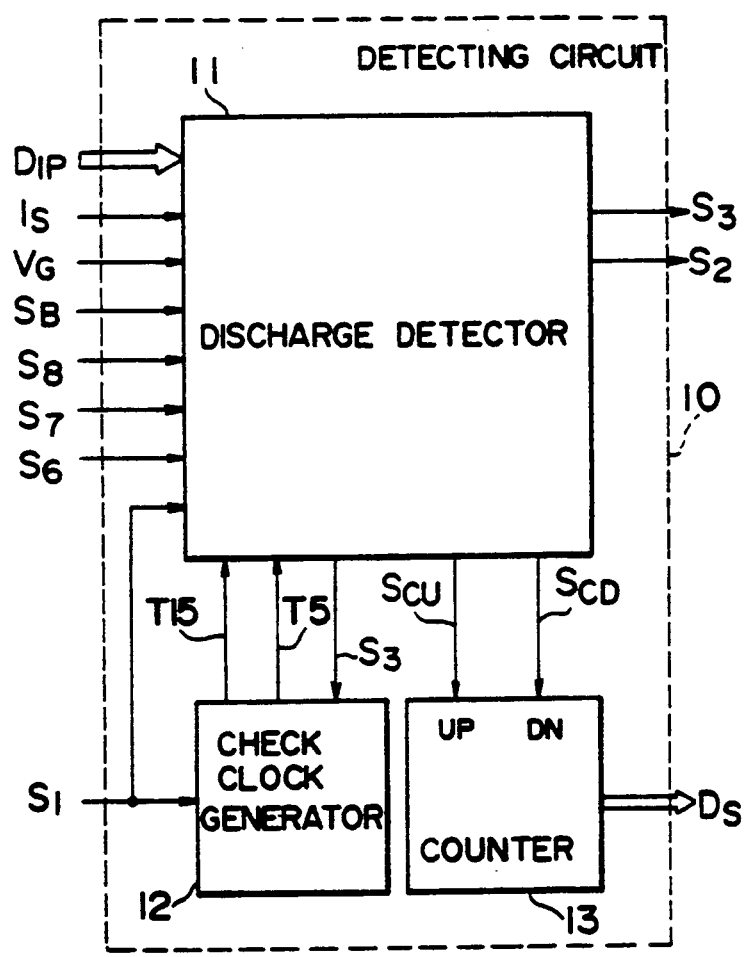
FIG. 8 is an embodiment of the detecting circuit of FIG. 1.

As illustrated in FIG. 8, an embodiment of the detecting circuit 10 may comprise a discharge detector 11, a check clock generator 12, and a counter 13. The discharge detector 11 has as inputs the peak current data $D_{IP}$, the current signal $I_S$, the gap voltage $V_G$, the base signal $S_B$, the ON end signal $S_8$, the OFF end signal $S_7$, the ON half signal $S_6$, and the clock signal $S_1$.

The check clock generator 12 produces a signal T15 and a signal T5 from the clock signal $S_1$ and the spark signal $S_3$ and supplies the signals T5 and T15 to the discharge detector 11. The signal T5 is a pulse produced 5 $\mu s$ after the start of the spark signal $S_3$ and the signal T15 is a pulse produced 15 $\mu s$ after the start of the spark signal $S_3$.

The counter 13 counts up when a count up signal $S_{CU}$ is received from the discharge detector 11 or counts down when a count down signal $S_{CD}$ is received from the discharge detector 11. The resultant count from the counter 13 is employed as the data signal $D_S$, which in turn, is supplied to the clock controller 20 for altering the OFF clock $S_5$ and thus the OFF time of the pulses applied across the gap G.

Figure 9:
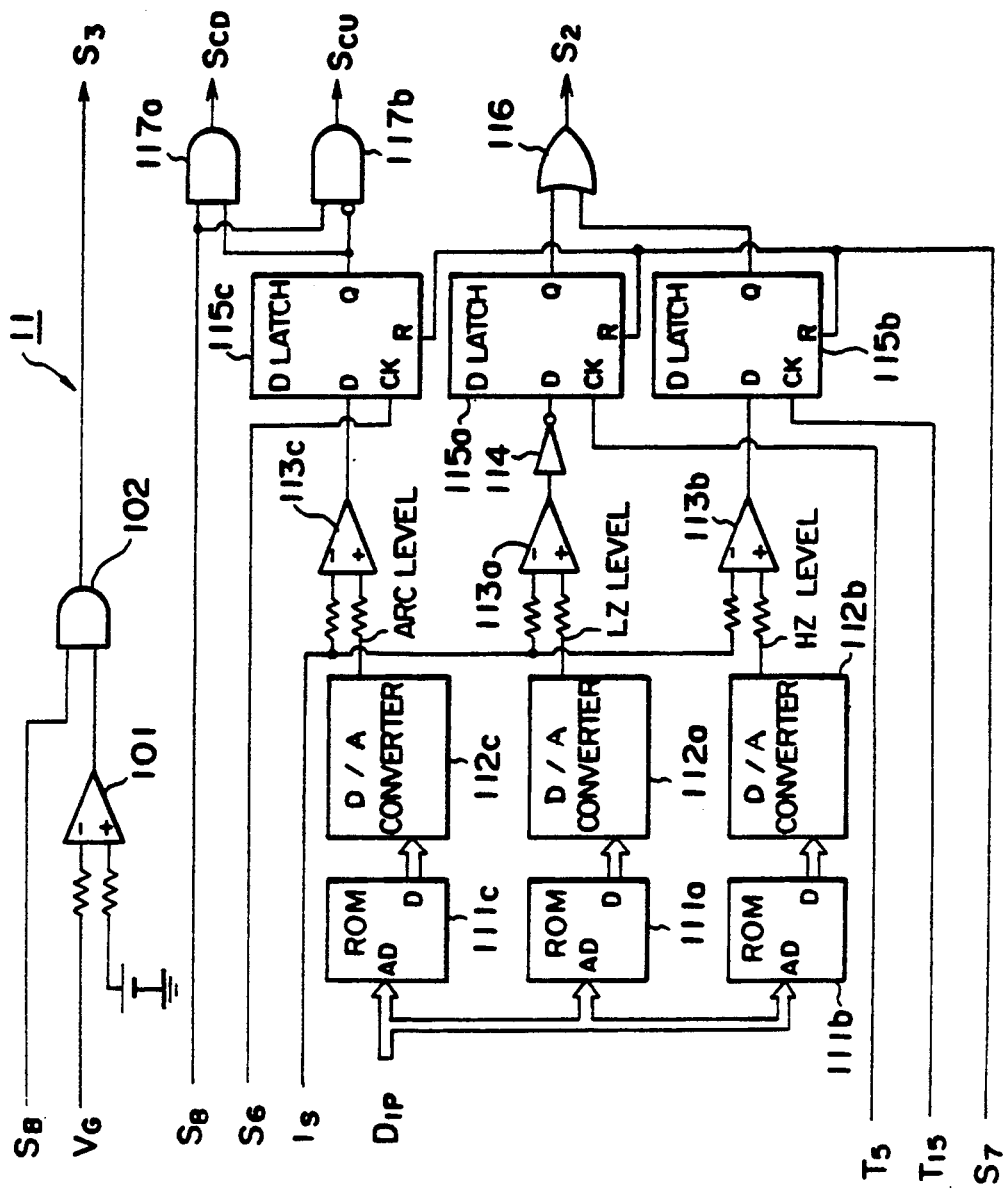
FIG. 9 is an embodiment of the discharge detector of FIG. 8.
Figure 10:
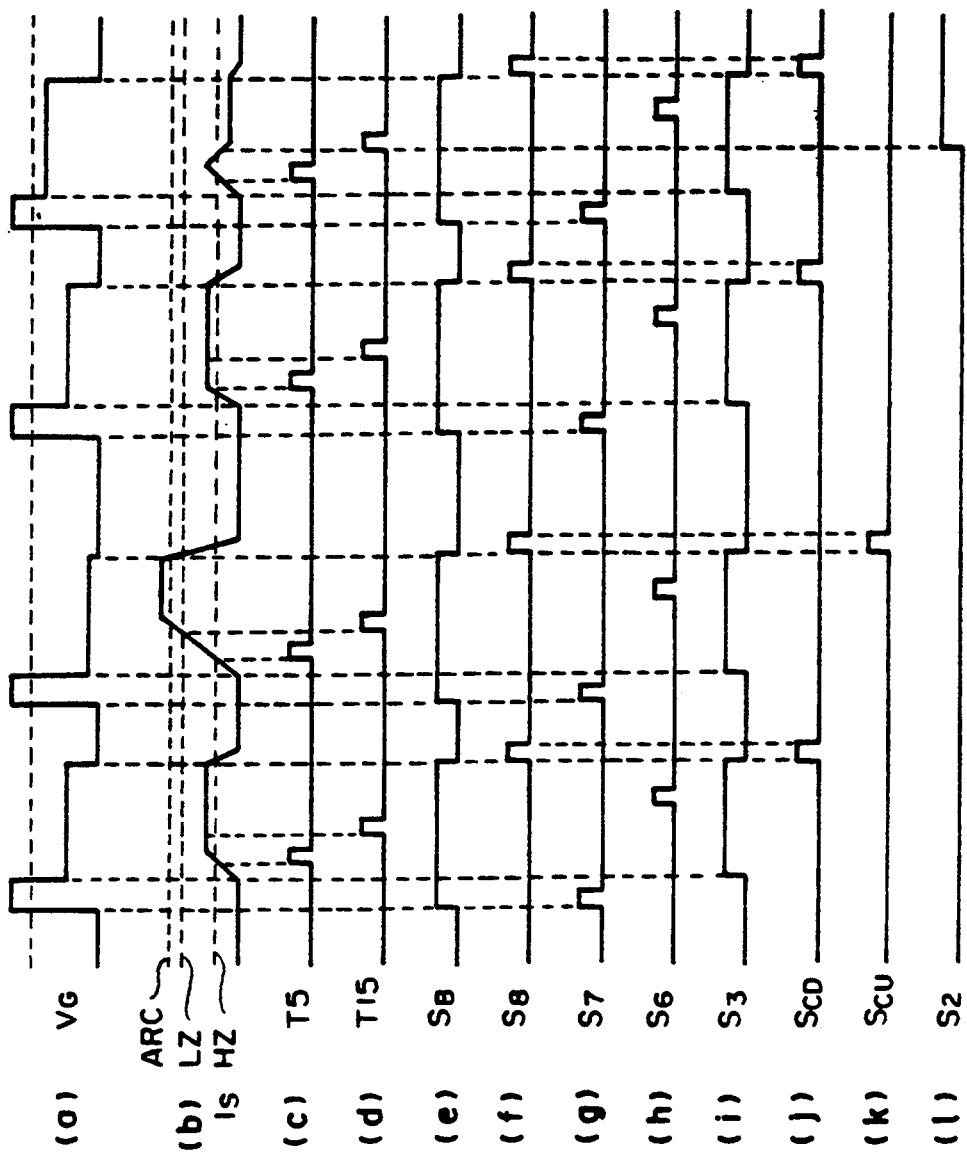
FIG. 10 is a timing chart for signals associated with the discharge detector of FIG. 9.

The discharge detector 11, an embodiment of which is shown in FIG. 9 with its exemplary timing chart in FIG. 10, may comprise an AND gate 102 and a comparator 101 for generating the spark signal $S_3$. The base signal $S_B$ will be used as the spark signal $S_3$ as long as the gap voltage $V_G$ is less than a reference value, as determined by the comparator 101. The reference level is depicted by a dashed line in graph (a) of FIG. 10.

Figure 2:
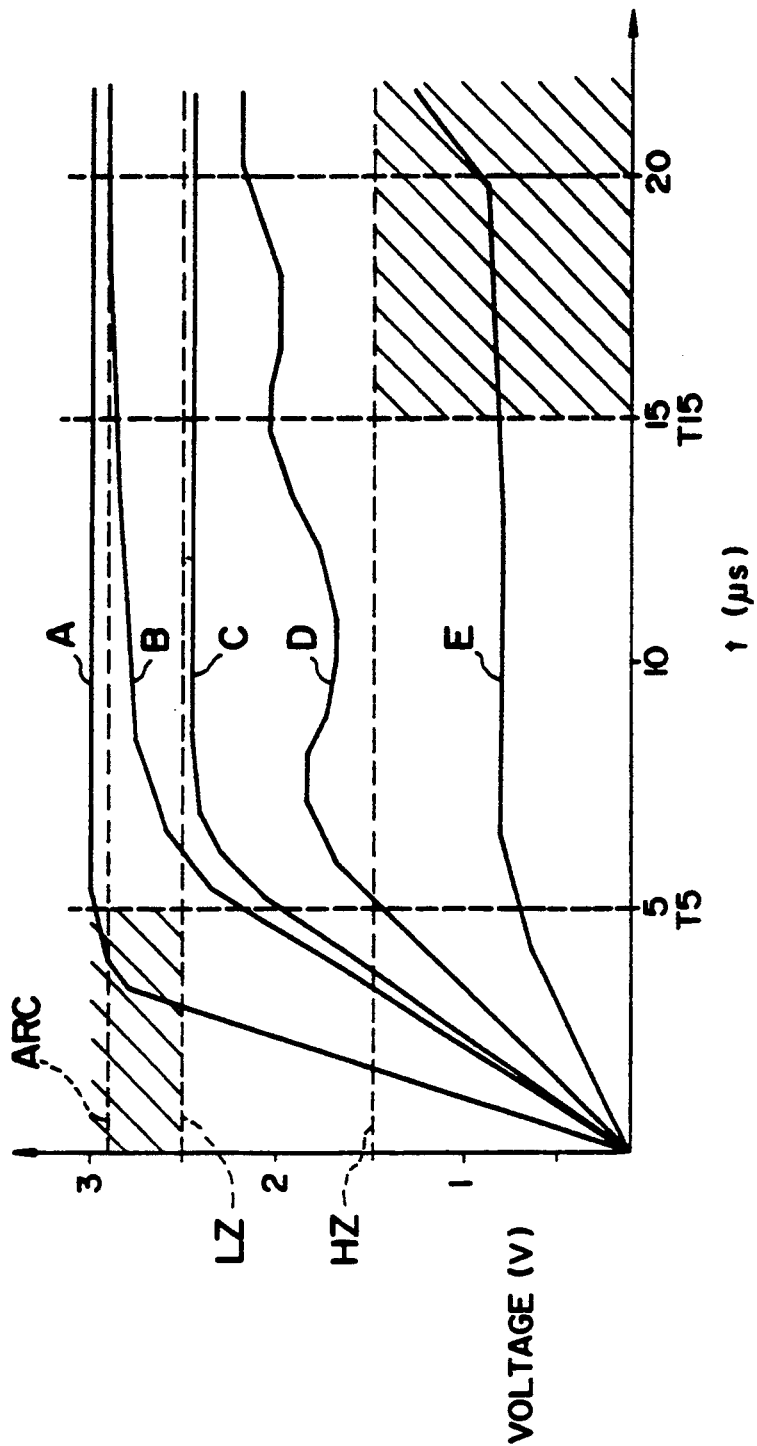
FIG. 2 is a timing chart illustrating various voltage signals at the gap.

ROMs 111a, 111b, and 111c store the value for the LZ level, the HZ level, and the ARC level respectively and generate these values based upon the peak current data $D_{IP}$. The outputs of ROMs 111a, 111b, and 111c are converted into analog form by D/A converters 112a, 112b, and 112c and are then supplied to the non-inverting inputs of comparators 113a, 113b, and 113c, respectively. Each of the comparators 113a, 113b, and 113c compares its respective level to the current signal $I_S$, which is received at its inverting input, and generates a signal with a logical value of "1" when the current signal $I_S$ is below the respective level. For instance, comparator 113a will generate a signal with a logical value of "1" when the current signal $I_S$ is below the LZ level. Graph (b) of FIG. 10 illustrates the current signal $I_S$ with the ARC level, HZ level, and LZ level depicted with dashed lines. With further reference to FIG. 2, it is desirable to have the current signal $I_S$ below the LZ level at 5 $\mu$s, above the HZ level at 15 $\mu$s, and below the ARC level halfway through the ON time.

A D latch circuit 115a receives the output of comparator 113a at its D input after it passes through an inverter 114, the signal T5 at its clock input CK, and the OFF end signal $S_7$ at its reset input R. A D latch circuit 115b receives the output of comparator 113b at its D input, the signal T15 at its clock input CK, and the OFF end signal $S_7$ at its reset input R. The output of comparator 113c is received at a D latch circuit 115c, which also receives the ON half signal $S_6$ at its clock input CK and the OFF end signal $S_7$ at its reset input R.

An OR gate 116 produces the signal $S_2$ based upon the Q outputs of D latch circuits 115a and 115b. Thus, when either the current signal $I_S$ is above the LZ level at 5 $\mu$s or below the HZ level at 15 $\mu$s, as indicated by the shaded areas in FIG. 2, the OR gate 116 will produce the signal $S_2$.

The count up signal $S_{CU}$ is produced by an AND gate 117b when both the ON end signal $S_8$ and an inverted output Q of D latch circuit 115c are received. The count up signal $S_{CU}$, produced when the gap voltage $V_G$ is above the ARC level halfway through the on time, is generated to increase the off time in order to prevent the arcing at the gap G. The count down signal $S_{CD}$ is produced when both the ON end signal $S_8$ and the output of D latch circuit 115c are received. The count down signal $S_{CD}$ results in a decrease in the off time which thereby increases the machining rate.

Examples for the settings of the LZ level, HZ level, and ARC level are illustrated in FIG. 11 for varying magnitudes of peak current. This exemplary data may be used as the peak current data $D_{IP}$. From the experimental results of FIG. 11, it is apparent that as the peak current increases, the voltage values for the LZ, HZ, and ARC levels decrease.

Figure 12:
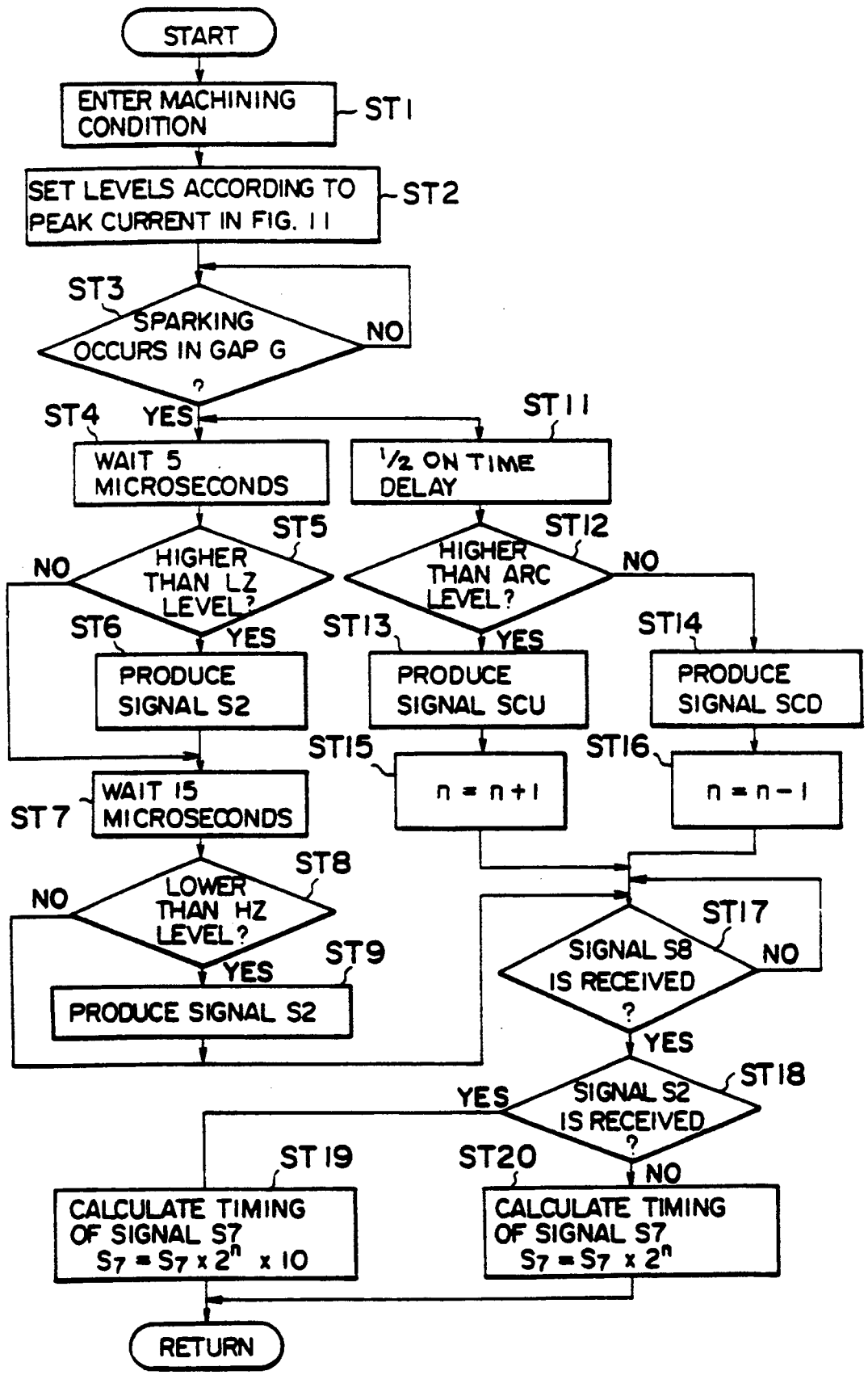
FIG. 12 is a flow chart illustrating an embodiment of the method of the invention.

An embodiment of the method for controlling the discharge current is illustrated in FIG. 12. The machining condition, including peak current, is first entered at a step ST1. The voltage levels for comparing the detected signal are then set, for example, according to the peak current data $D_{IP}$ at a step ST2.

At step ST3, an inquiry is made as to whether electric discharging is occurring between the electrode 1 and the workpiece 2. If discharging is occurring, then the method advances to step ST4, otherwise the method loops back and repeats the step ST3. At the step ST4, the processing is delayed until 5 $\mu$s after the onset of discharging.

Next, at step ST5, the voltage of signal $I_S$ is compared to the level LZ, and if it is higher than the LZ level, processing proceeds to step ST6 and signal $S_2$ is produced. When the voltage of signal $I_S$ is not higher than the LZ level, processing skips over to step ST7.

At step ST7, the processing is delayed until 15 $\mu$s after the onset of the discharging. Then, at a step ST8, the voltage of signal $I_S$ is compared to the HZ level, and if it is lower than the HZ level, processing proceeds to step ST9 and signal $S_2$ is produced. Otherwise, processing proceeds to step ST17.

Processed in parallel with the steps ST4 to ST9 are steps ST11 to ST16. At step ST11, a delay of half the on time is incurred. Then, at a step ST12, the voltage level of signal $I_S$ is compared to the ARC level and a count up signal $S_{CU}$ is produced if the voltage level of signal $I_S$ is greater than the ARC level and at step ST15 the count of "n" is increased by one. Otherwise, when the voltage level of signal $I_S$ is not higher than the ARC level, a count down signal $S_{CD}$ is produced and the count of "n" is decreased by one.

After the processing of both parallel branches, an inquiry at step ST17 is made as to whether the ON end signal $S_8$ has been received. The processing remains at step ST17 until the ON end signal $S_8$ is received. Next, an inquiry is made at step ST18 as to whether the signal $S_2$ is received. If the signal $S_2$ has been received, then at step ST19 the timing of the OFF end signal $S_7$ is calculated according to the equation $S_7 = S_7 \times 2^n \times 10$. When the signal $S_2$ is not received, the OFF end signal $S_7$ is calculated according to the equation $S_7 = S_7 \times 2^n$. Since the OFF end signal $S_7$ is used to determine the duration of the off time, receipt of the signal $S_2$ will lengthen the off time by a factor of ten.

Figure 13:
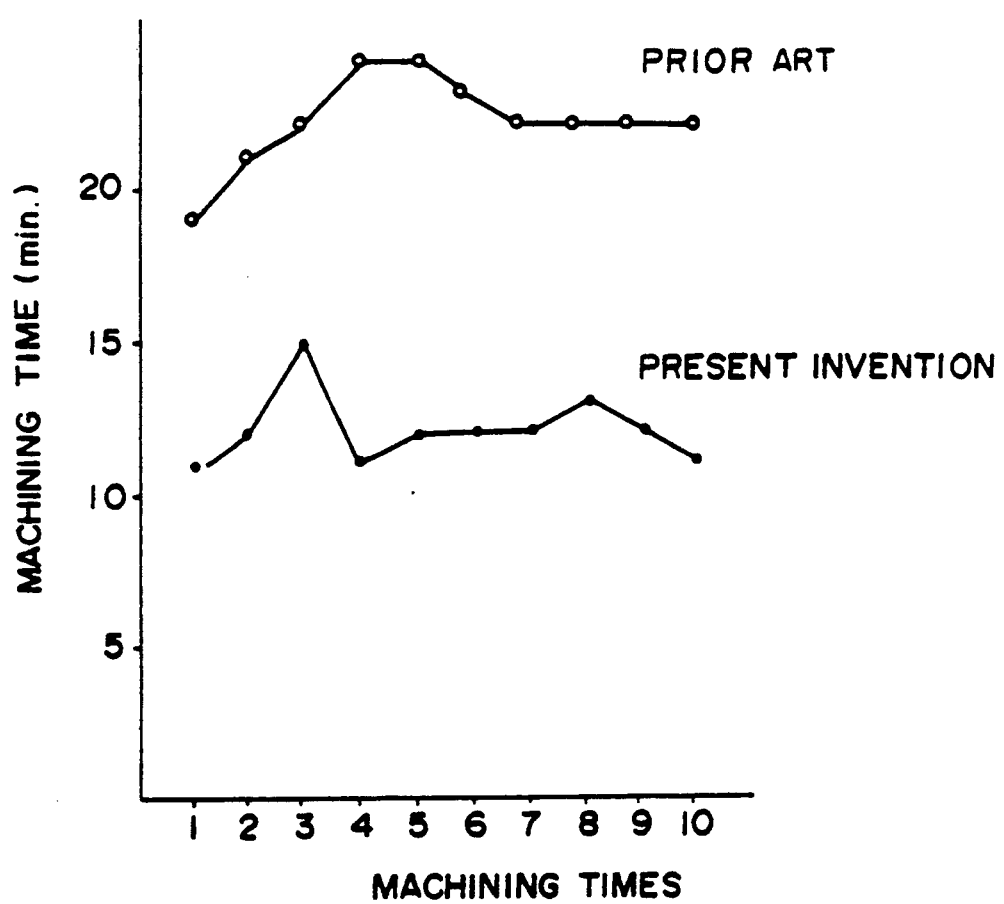
FIG. 13 is a graph comparing the invention with the prior art.

FIG. 13 depicts experimental comparisons of the conventional EDM machine with the EDM machine of the present invention. In the experiment, the machining condition was set to an ON time of 80 microseconds, an OFF time of 20 microseconds, a peak current data $D_{IP}$ of 4 amps, and a machining voltage of 90 volts. Further, the positive polarity of the voltage was applied to the machining electrode, which is the "reverse polarity" connection. The workpiece is made of a rigid material and a copper tungsten (CuW) alloy having a diameter of 5 mm was used as the electrode. Ten 0.5 mm deep holes were machined in a straight line with the above-stated machining conditions, which is conducive to unstable discharges.

As seen in FIG. 13, the machining time for the present invention is nearly half of that for the conventional machine for each of the ten holes machined. Further, the surface condition of the workpiece cut with the conventional machine exhibited arc craters, scars, and stains at the bottom of the cut holes due to the unstable machining state. In comparison, surface condition of the workpiece cut with the present invention exhibited significantly fewer arc craters, scars, and stains.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention only be limited by the claims appended hereto.

We claim:

1. An apparatus for controlling a discharge current through a gap formed between an electrode and a workpiece comprising:
    (a) a circuit for applying a voltage pulse having an on time and an off time across said gap;
    (b) a monitoring circuit, including means for generating a detection current for monitoring an electrical characteristic of said gap;
    (c) means, connected to said monitoring circuit, for comparing the level of said monitored electrical characteristic at least at two predetermined times during said voltage pulse on time with at least two predetermined reference levels and thereby generating comparison output signals;
    (d) means for classifying a condition at said gap into at least a first condition or a second condition based upon said comparison output signals; and
    (e) means, connected to said first circuit and to said classifying means, for increasing the off time when said gap is classified into said first condition and for decreasing said off time when said gap is classified into said second condition.

2. An apparatus for controlling a discharge current as set forth in claim 1, wherein said comparing means compares the level of said electrical characteristic at a first predetermined time to a first predetermined level to determine whether said gap has a low impedance, compares the level of said electrical characteristic at a second predetermined time to a second predetermined level to determine whether said gap has a high impedance, compares the level of said electrical characteristic at a third predetermined time to a third predetermined level to determine whether arcing is occurring at said gap, and said classifying means classifies said gap into said first condition when said gap has said low impedance, said high impedance, or said arcing.

3. An apparatus for controlling a discharge current as set forth in claim 2, wherein said gap is classified into said second condition when said gap does not have said low impedance, said high impedance, or said arcing and said increasing means decreases said off time in order to increase a rate of machining.

4. The apparatus according to claim 1 wherein said circuit for applying a voltage pulse comprises a power supply, a current limiting means and a switching means in series with said machining gap.

5. The apparatus according to claim 4 wherein said monitoring circuit comprises a power supply, a switching means and a current detecting means, wherein the switching means of said monitoring circuit is operable to connect the power supply of the monitoring circuit to the machining gap, whereby said detection current is generated.

6. The apparatus according to claim 1 wherein said monitoring circuit comprises a power supply, a current limiting means, a switching means, and a detecting means.

7. The apparatus according to claim 6 further comprising a gap voltage sensing circuit connected across said machining gap and a detecting means responsive to said gap voltage sensing circuit and said detecting current for generating an off time altering signal.

8. An apparatus for controlling a discharge current comprising:
    (a) a circuit for applying a voltage pulse having an on time and an off time across a gap formed between an electrode and a workpiece;
    (b) a monitoring circuit for monitoring an electrical characteristic of said gap;
    (c) means, connected to said monitoring circuit, for comparing the level of said monitored electrical characteristic at least at one predetermined time with at least one predetermined reference level and thereby generating a comparison output signal;
    (d) means for classifying a condition at said gap into at least a first condition or a second condition based upon said comparison output signal; and
    (e) means, connected to said first circuit and to said classifying means, for increasing the off time when said gap is classified into said first condition and for decreasing said off time when said gap is classified into said second condition; and wherein said at least one predetermined reference level is changed in accordance with a peak current discharged across said gap.

9. A method for controlling a discharge current comprising the steps of:
    (a) applying a voltage pulse having an on time and an off time across a gap formed between an electrode and a workpiece using a first circuit;
    (b) monitoring a detection current passed through said gap;
    (c) comparing the level of said detection current at least at two predetermined times during said on time, with at least two predetermined reference levels and thereby generating comparison output signals;
    (d) classifying a condition at said gap into at least a first condition or a second condition based upon said comparison output signals; and
    (e) increasing the off time when said gap is classified into said first condition and decreasing said off time when said gap is classified into said second condition.

10. A method for controlling a discharge current as set forth in claim 9, wherein said step of comparing further comprises comparing the level of said electrical characteristic at a first predetermined time to a first predetermined level to determine whether said gap has a low impedance, comparing the level of said electrical characteristic at a second predetermined time to a second predetermined level to determine whether said gap has a high impedance, comparing the level of said electrical characteristic at a third predetermined time to a third predetermined level to determine whether arcing is occurring at said gap, and said step of classifying further comprises classifying said gap into said first condition when said gap has said low impedance, said high impedance, or said arcing.

11. A method for controlling a discharge current as set forth in claim 10, wherein said step of classifying further comprises classifying said gap into said second condition when said gap does not have said low impedance, said high impedance, or said arcing and said step of increasing decreases said off time in order to increase a rate of machining.

12. A method for controlling a discharge current comprising the steps of:

(a) applying a voltage pulse having an on time and an off time across a gap formed between an electrode and a workpiece using a first circuit;
(b) monitoring an electrical characteristic of said gap;
(c) comparing the level of said monitored electrical characteristic at least at one predetermined time, with at least one predetermined reference level and thereby generating a comparison output signal
(d) classifying a condition at said gap into at least a first condition or a second condition based upon said comparison output signal; and
(e) increasing the off time when said gap is classified into said first condition and decreasing said off time when said gap is classified into said second condition; and changing said at least one predetermined reference level in accordance with a peak current discharged across said gap.

* * * * *